May 5, 1936.  H. A. W. WOOD  2,039,471

WEB ROLL ELECTRICAL SPEED CONTROL

Original Filed Feb. 7, 1934  4 Sheets-Sheet 1

Inventor
Henry A. Wise Wood
By attorneys
Southgate Fay & Hartley

May 5, 1936.   H. A. W. WOOD   2,039,471
WEB ROLL ELECTRICAL SPEED CONTROL
Original Filed Feb. 7, 1934   4 Sheets-Sheet 2
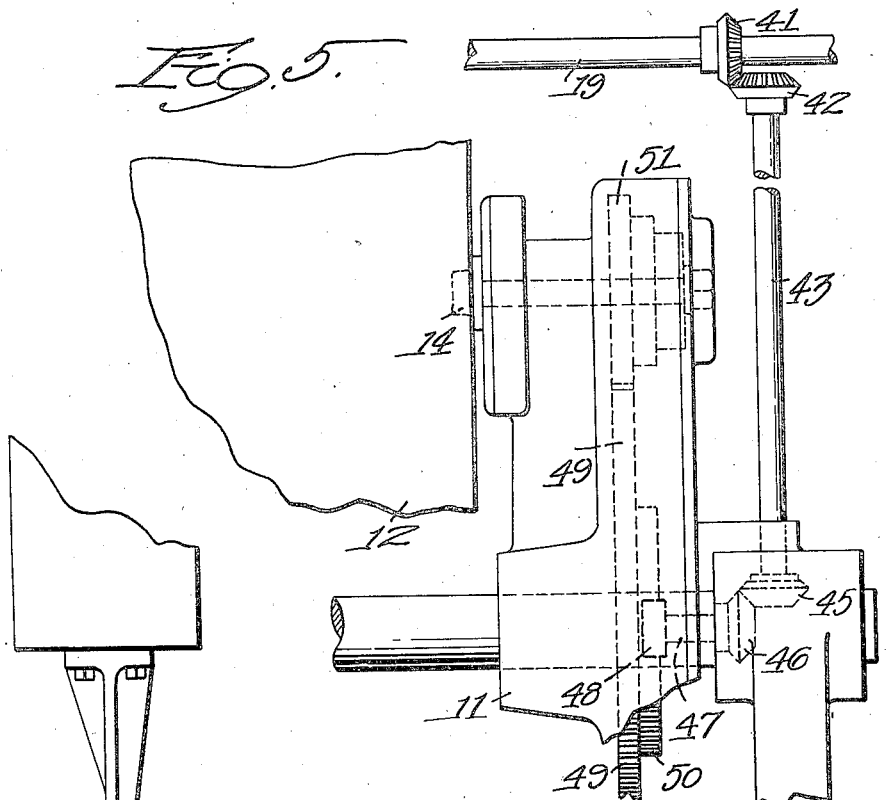
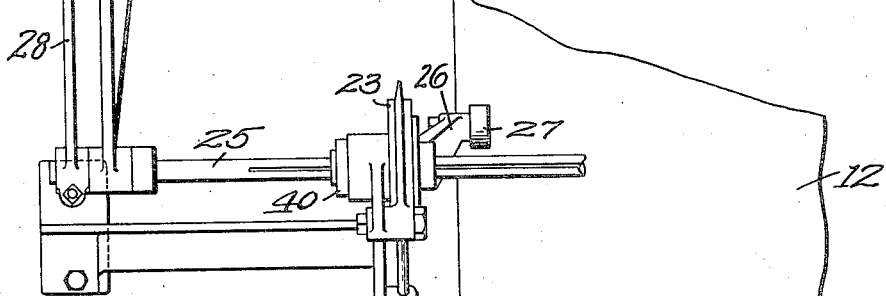
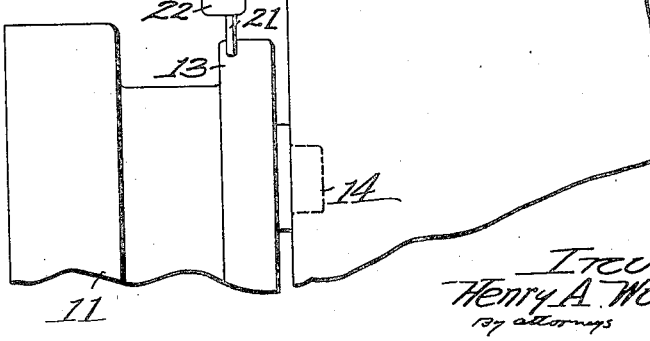

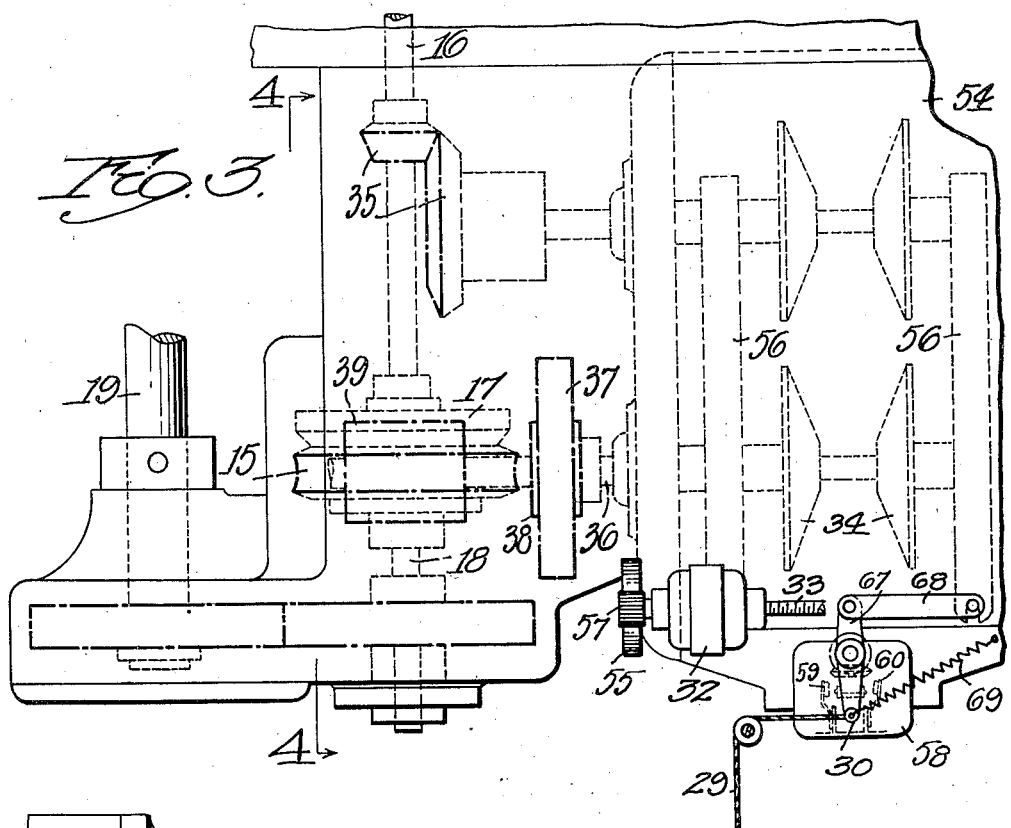
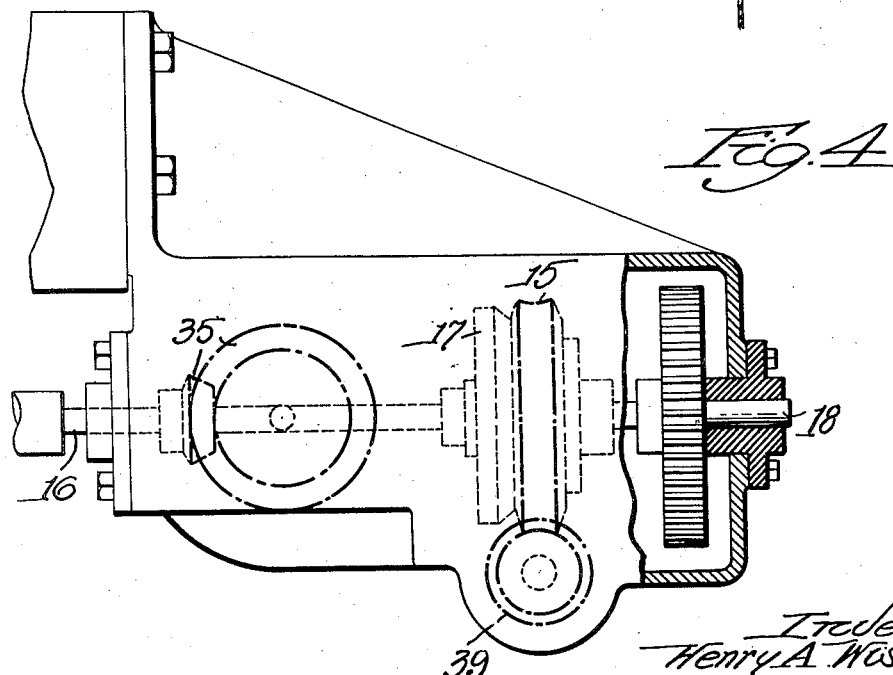

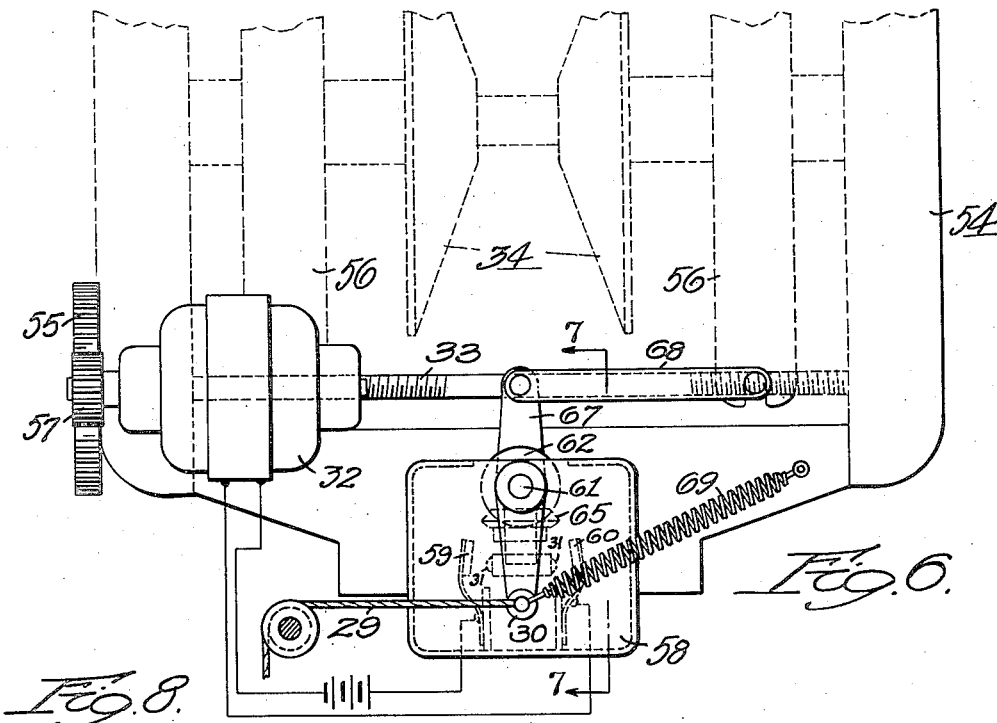

Patented May 5, 1936

2,039,471

UNITED STATES PATENT OFFICE 2,039,471

WEB ROLL ELECTRICAL SPEED CONTROL

Henry A. Wise Wood, New York, N. Y., assignor to Wood Newspaper Machinery Corporation, New York, N. Y., a corporation of Virginia Application February 7, 1934, Serial No. 710,096
Renewed February 17, 1936

10 Claims. (Cl. 242—58)

I have previously invented a means for bringing a web roll up to speed by power applied through the spindle of the roll for the purpose of getting the surface speed of the roll substantially equal to the web speed at the time of pasting.

The principal objects of this invention are to provide electrical means, operated by the roll itself, for automatically controlling the rate of transmission of speed from the printing press to the spindle of the roll at the time of splicing; to provide means for providing a variable speed drive mechanism wherein the principal power transmitted is conveyed through a differential mechanism carrying a by-pass arrangement which furnished only the small differences in speed demanded by the paper change mechanism; to provide a high degree of sensitivity in regulation, and to provide means whereby very little power is transmitted by the variable speed device due to a locking action of the worm and worm wheel carried by the differential with a rotation of the worm in the direction of the normal thrust of the differential so that this variable speed transmission really just turns the worm in the direction that it is easiest to turn.

Other objects and advantages of the invention will appear hereinafter.

Reference is to be had to the accompanying drawings, in which

Fig. 2 is a front view of one end of the same looking in the direction of the arrow 2 in Fig. 1;

Fig. 3 is a plan view of the differential looking in the direction of the arrow 3 in Fig. 1;

Fig. 4 is a sectional view on the line 4—4 of Fig. 3;

Fig. 5 is a sectional view through the center of the reel showing the means for driving the roll on end through its own axis;

Fig. 6 is an enlarged view of the transmission and the control contacts;

Fig. 7 is a side view partially in section of the same taken on line 7—7 of Fig. 6;

Fig. 8 is an elevation of the control contacts showing them in position just as a large roll comes into measuring position;

Figure 1:
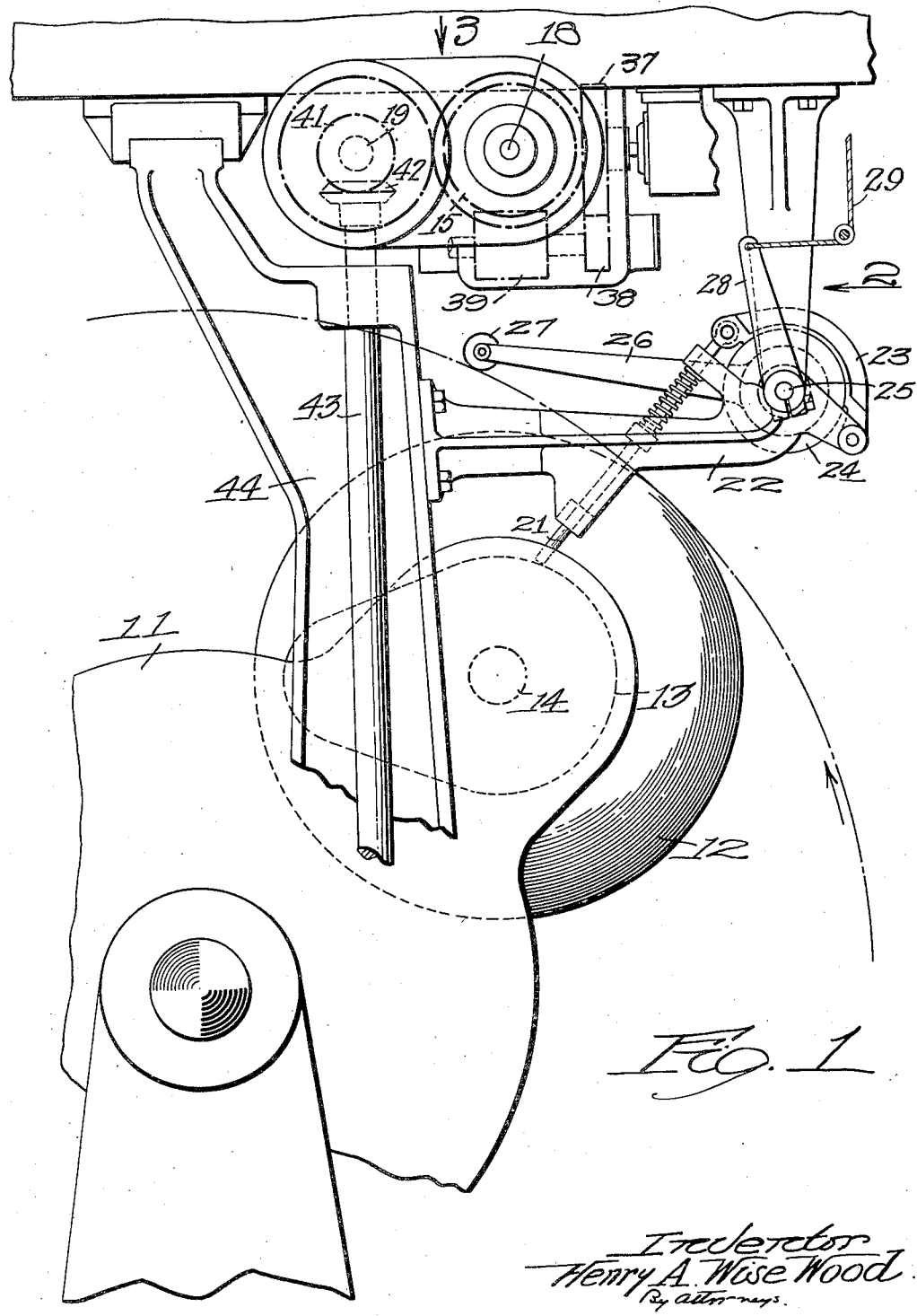
Fig. 1 is an end view of a part of a web roll supporting reel and associated parts constructed in accordance with this invention and indicating the path of the new roll as it moves toward splicing position.

Fig. 9 is a similar view showing the position of the contacts after the control motor has set the variable speed transmission corresponding to the size of a large roll just measured, as shown in Fig. 8, and Figs. 10 and 11 are similar views showing the positions of the control contacts as a small roll is brought up to measuring position in Fig. 10 and the transmission is set to give the proper surface speed to the new roll, as shown in Fig. 11.

The invention, of course, is shown as applied to a reel having means not shown for rotating it in a counterclockwise direction, as indicated by the arrow in Fig. 1. On this reel are spiders 11 carrying web rolls 12, only one being shown. On each of the arms of the reel is a cam 13, the purpose of which will appear later.

It will be understood that this reel operates in the usual way, preferably by a motor, and when a new roll 12 is to be spliced to the running web, the reel is turned to bring the roll up from a low position at the right through the position shown in Fig. 1. It is through the spindle 14 of the roll 12 that power is applied to rotate this roll on its own axis up to web speed.

The power for rotating the spindle 14 is applied from some convenient point on the press so that its speed is always controlled by the speed of the press. In this case a shaft 16, shown in Fig. 3, receives power direct from the press. This supplies power through a differential 17 of the well known bevel type to a shaft 18 preferably at a lower speed.

To this shaft is geared a horizontal shaft 19. From the shaft 19 the power is applied to the roll spindle 14. Bevel gear 41 is splined to shaft 19 and meshes with bevel gear 42 splined to upright shaft 43, which is rotatably mounted on end bracket 44. The lower end of shaft 43 carries bevel gear 45 which meshes with bevel gear 46, the latter being secured to short shaft 47 the other end of which mounts pinion 48. Large gear 49 is rotatably mounted on a hub of spider 11 and has secured thereto gear 50 which meshes with pinion 48. Large gear 49 meshes with one gear 51 rotatably mounted on each of the spindle 14. A clutch, preferably a magnetic clutch, is mounted one on each of the spindles 14 to connect selectively gear 51 to the particular spindle 14 carrying the new roll.

If the outside portion of the differential were held stationary the new roll would rotate directly in proportion to the speed of the press. In order to run the roll at the proper surface speed from its spindle the outside of the differential is made in the form of a worm gear 15, which is turned at different ratios to the speed of the shaft 16 in accordance with the diameter of the new roll.

The purpose of this invention is to so operate the worm gear 15 that the size of the roll 12 will regulate the speed of transmission perfectly to bring the surface of the roll 12 substantially into synchronism with the speed of the web at the time of splicing or before.

It will be understood, of course, that the reel moves the roll 12 bodily from a position at the lower right hand side through the position shown in Fig. 1. During this rotation, at the position indicated, the cam 13 comes into contact with and pushes out, a spring pressed rod 21.

The rod 21 is mounted on a bracket 22 and moves a pivoted arm 23 which normally holds a brake disc 24, mounted on a shaft 25. The arm 23 releases the disc. This frees the shaft 25 which carries an arm 26 having a roller 27 on the end. There is nothing now to hold this arm up and the roller drops on the new web roll 12, which, as stated, is moving up. By the upward motion of this roll the arm 26 is forced upwardly. The amount of rise of the roller 27 is determined by the diameter of the web roll 12. This roller 27 thus accurately measures the diameter of the incoming roll. As soon as the cam 13 passes the rod 21, its spring moves it back and the arm 23 holds the arm 26 out where it is left by the new roll ready to be released again by the next cam.

On the shaft 25 is fixed an arm 28 which is connected by a chain or other connection 29, with a lever 30. On a contact arm 64 are two contacts 31 which connect circuits to operate a motor 32 in either direction in accordance with the position of the arm 28 with respect to the setting of variable speed transmission 34.

Thus the motor turns an adjusting screw 33 in one direction or the other. By well known connections a nut on this screw adjusts a cone pulley variable speed transmission 34.

Referring to Fig. 6 it is seen that transmission frame 54 supports the well known adjustable cone pulleys 34 over which runs a V-belt. Adjustments of the cone pulley positions are done by an adjusting screw 33 cooperating with pulley adjusting levers 56 through right and left handed screw connection. Screw 33 is rotatably mounted in the frame of transmission 54 and carries gear 55 secured to one end for meshing with pinion 57. Pinion 57 is carried on the shaft of motor 32 and it is evident that rotation of motor 32 in one direction or the other will shift cones 34 to vary the ratio of worm wheel 15 to shaft 16 and thus shaft 18 to shaft 16.

Control box 58 constitutes part of the transmission frame 54 and provides insulated mounting for spring contacts 59 and 60. Arm 30 is secured to short shaft 61 whose other end carries gear 62 and along with short shaft 63 mounts contact arm 64 which carries gear 65, meshing with gears 62 and 66, and also insulated contacts 31. Reset arm 67 is secured to short shaft 63 and has its free end pivotally attached to link 68 the other end of which is pivotally secured to adjusting lever 56.

Thus when roller 27 rides up on roll 12 chain 29 in cooperation with spring 69, according to the diameter of the roll may move arm 30 to the position shown in Fig. 10 thereby closing contacts 31 and 59. The closing of these contacts can be used by anyone skilled in the art to cause motor 32 to rotate adjusting screw 33 so that cones 34 at the lower end of Fig. 3 are brought closer together and the upper cones 34 separated. This continues until the setting is correct for the surface speed of roll 12 to equal that of the web. The movement of the cones as described above causes link 68 to move reset arm 67 to the left as shown in Fig. 11 and through gears 66 and 65 rotate contact arm 64 in a counter clockwise direction thereby opening contacts 31 and 59 causing motor 32 to cease rotating. Spring 69 is attached at one end to arm 30 and at the other to the frame of transmission 54 to keep chain 29 taut. It is evident that the reverse action takes place when contacts 31 and 60 meet as shown in Figs. 8 and 9 and that this automatic action will set the speed of transmission 54 as each new roll is brought to pasting position.

The transmission 34 is driven from the shaft 16 by gears 35 and its output shaft 36 has a gear 37 meshing with a pinion 38 on a shaft on which is a worm 39 operating the worm gear 15. Thus the outside portion of the differential is rotated at adjustable speeds controlled by the diameter of the roll 12. The proper surface speed of the roll is thus made automatic.

Any end motion of the brake disc that may be demanded when shifting for side register, or in moving this end of the spider to provide for fractional width rolls, is accomplished automatically by hubs and collars 40 on the shaft 25.

It will be seen, therefore, that the speed ratio is adjusted preparatory to splicing in accordance with the diameter of the roll, and this is done entirely automatically without any attention on the part of the operator.

An automatic setting device is provided for setting the surface speed of the incoming roll, irrespective of its diameter, to correspond with that of the web regardless of the speed of the press. Further, that this variable speed transmission, owing to an adjustable by-pass, provides a very sensitive adjustment with only a small amount of power being transmitted by the variable speed device.

This is a continuation in part of my application filed July 7, 1931, Serial No. 549,127, on Web roll electrical speed control.

Having thus described my invention and the advantages thereof, I do not wish to be limited to the details herein disclosed, otherwise than as set forth in the claims, but what I claim is:—

1. In a device for rotating a fresh web roll up to web speed preparatory to pasting, the combination with adjustable speed means for rotating the web roll at its axis from the printing press to which it is to deliver its web, means for changing the speed by which the power is delivered to the fresh roll, said means comprising a speed-changing device and a motor for operating it, and means movable by the fresh roll, and thereby controlled by the size of the roll, for electrically connecting the motor with a source of power to run it in either direction in accordance with the size of the fresh roll, the motor having little work to perform in order to change the speed of transmission of power to the fresh roll.

2. In a device for rotating a fresh web roll at web speed preparatory to pasting, the combination of means capable of variation for rotating the web roll from its axis by the power of the press, a shaft having an arm thereon, a roller on the arm for engaging the fresh web roll and thereby adapted to maintain a position dependent on the diameter of the fresh web roll, another arm on said shaft movable with the first-named arm, means connected with the second arm for controlling the speed of transmission to the web roll, a brake disc on said shaft, means for holding the brake disc stationary and therefore the first arm in elevated position, and means adapted to be engaged when the web roll is brought into pasting position for releasing said brake and allowing the roller to drop on the surface of the web roll by the action of gravity.

3. In a device for rotating a fresh web roll up to web speed preparatory to pasting, the combination with adjustable speed means for rotating the web roll at its central axis from the printing press to which it is to deliver its web, means for changing the speed by which the power is delivered to the fresh roll, said means comprising a speed-charging device and a motor for operating it, a lever having contacts on opposite sides, a pair of opposite contacts in line with the two contacts on the lever, circuits connecting the last contacts with the motor to rotate it in either direction, whereby when the lever moves in one direction the motor will be turned forward and when the lever moves in the other direction the motor will be turned backward, and means movable by the fresh roll for operating said lever to run the motor in either direction in accordance with the size of the fresh roll.

4. In a web roll rotating device for a printing press, the combination of means for moving the web roll bodily along a path, a differential connected to be operated by the press, means independent of the web for rotating the fresh web roll on its axis from the differential, and means in position to be engaged by the circumference of the fresh roll as it moves bodily to splicing position for varying the speed of the differential to set the surface speed of the fresh roll, irrespective of its diameter, substantially at the speed of the running web of the press.

5. The combination with a printing press and a shaft running in proportion to the speed of the press, of a differential operated by said shaft and connected for rotating a web roll on its own axis from its center, a rotatable reel in which the web roll is mounted, a device engaging the cylindrical surface of the web roll and movable out and in in accordance with its diameter, and means controlled by the position of said device for controlling the speed of the transmission of power to the roll through said differential.

6. In a web roll rotating device, the combination with a shaft operated by a printing press, of a differential constantly operated by said shaft means connected with the web roll for rotating it on its own axis from said differential, connections to the differential for rotating the differential at different speeds to modify the speed of the roll, and a movable support on which the web roll is carried to splicing position, of movable means adapted to engage the cylindrical surface of said roll as it is moved bodily by its support to be moved thereby to a position determined by the diameter of the roll for operating said connections to cause the roll to rotate substantially at web speed.

7. In a web roll rotating device, the combination with a shaft operated by a printing press at a speed proportional to the speed of the press, of a differential constantly operated by said shaft, means connected with the center of the web roll for rotating it from said differential, movable means adapted to engage the cylindrical surface of said roll to be moved thereby to a position determined by the diameter of the roll, a variable speed device, a motor for operating the variable speed device, means operated by the variable speed device for changing the speed transmitted by the differential, and means connected to be operated by said movable means for controlling the variable speed device according to the diameter of the web roll.

8. In a web roll speed control device, the combination with a shaft operated by a printing press, a differential connected with said shaft to be operated thereby, means connected with the differential for controlling its speed of transmission, a shaft driven by the differential at controlled speeds, and means connected with said shaft for rotating a web roll by its own spindle, of a member in position to be engaged by the fresh web roll and mounted to be moved by the fresh web roll into a position controlled by the diameter thereof, a worm gear for regulating the differential, a worm for turning the gear, a variable speed transmission operated by the first named shaft for rotating the worm, a motor for controlling the speed of said transmission and electrical means operated by said member for connecting up the motor to run it in either direction.

9. In a web roll speed control device, the combination of a movable reel for supporting the fresh web roll, said reel having a projection, of a differential operated by the press and operating the web roll through its axis, means contacting with the surface of the web roll when it comes to measuring position for controlling the operation of said differential, a brake for holding said contacting means out of contact with the web roll, and means in position to be engaged by said projection as the reel moves into pasting position for releasing said brake and allowing the contacting means to drop into contact with the web roll.

10. In a web splicing device, the combination of a rotatable reel for supporting the fresh roll, means for driving the fresh roll through its spindle in proportion to the speed of the press, and a by-pass in said fresh roll driving means for controlling rotation of the fresh roll with respect to its diameter.

HENRY A. WISE WOOD.